April 25, 1967   W. C. FERGUSON   3,315,519
SURGICAL GLOVE LEAK TESTER
Filed April 13, 1964   10 Sheets-Sheet 2

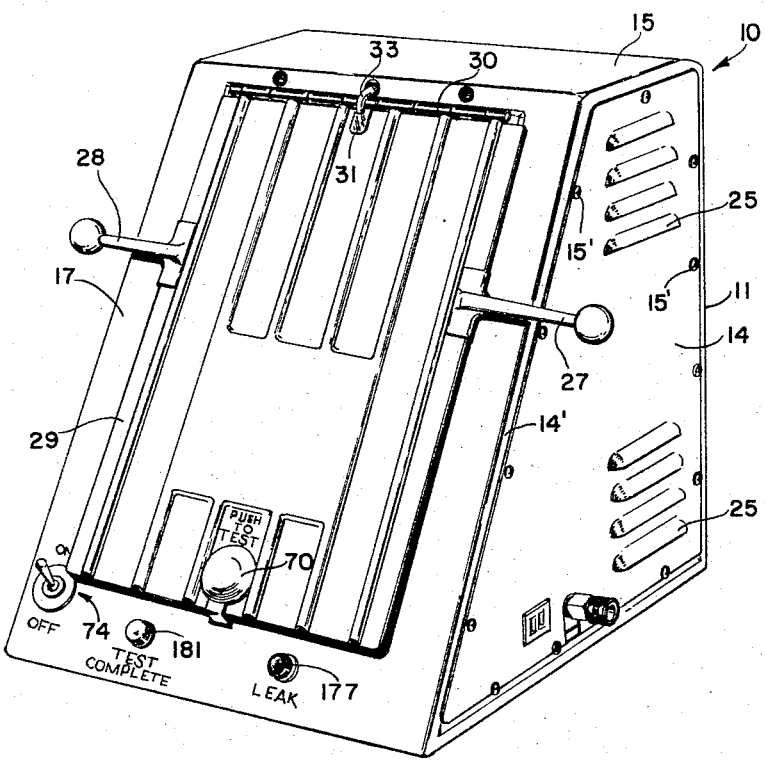
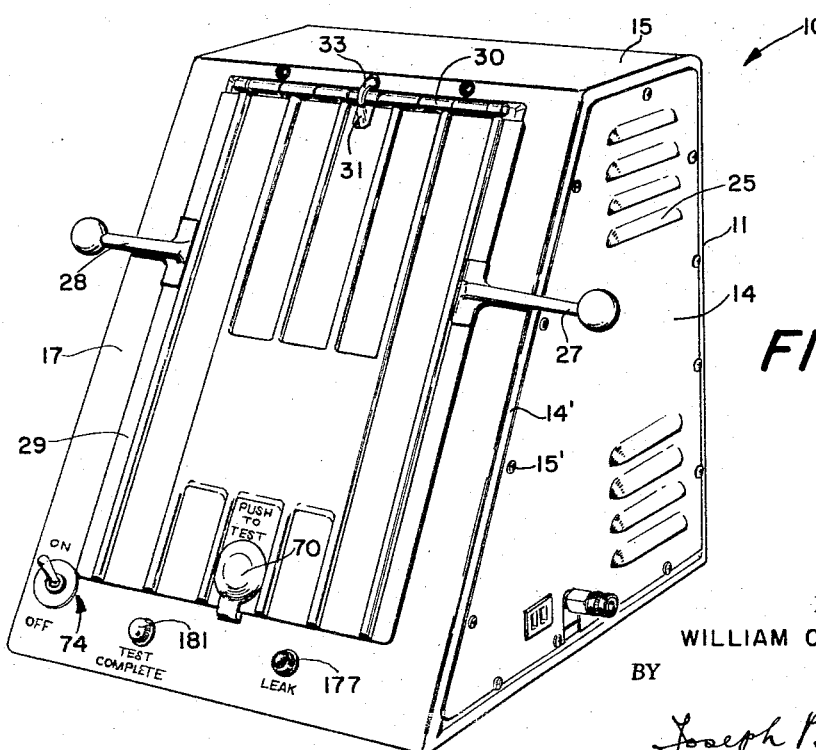

INVENTOR
WILLIAM C. FERGUSON
BY
Joseph P. Gastel
ATTORNEY

April 25, 1967   W. C. FERGUSON   3,315,519
SURGICAL GLOVE LEAK TESTER
Filed April 13, 1964   10 Sheets-Sheet 3

INVENTOR.
WILLIAM C. FERGUSON
BY
Joseph P. Gastel
ATTORNEY

INVENTOR.
WILLIAM C. FERGUSON
BY
Joseph P. Gastel
ATTORNEY

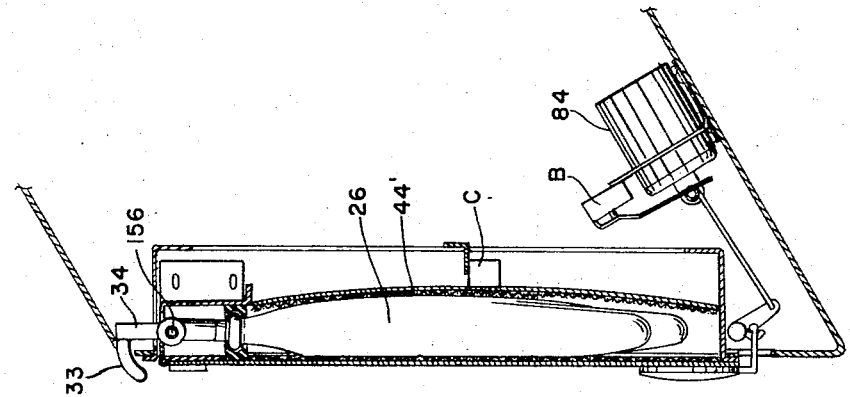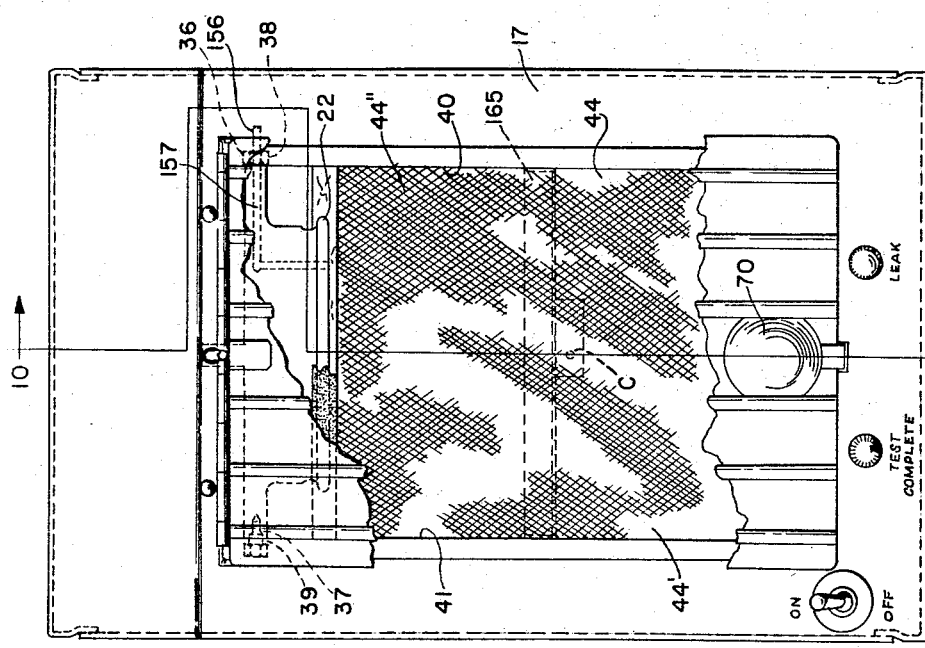

April 25, 1967 W. C. FERGUSON 3,315,519
SURGICAL GLOVE LEAK TESTER
Filed April 13, 1964 10 Sheets-Sheet 8

INVENTOR.
WILLIAM C. FERGUSON
BY
Joseph P. Gastel
ATTORNEY

April 25, 1967 W. C. FERGUSON 3,315,519
SURGICAL GLOVE LEAK TESTER
Filed April 13, 1964 10 Sheets-Sheet 9

INVENTOR.
WILLIAM C. FERGUSON

BY
Joseph P. Dastel
ATTORNEY

April 25, 1967 W. C. FERGUSON 3,315,519
SURGICAL GLOVE LEAK TESTER

Filed April 13, 1964 10 Sheets-Sheet 10

INVENTOR.
WILLIAM C. FERGUSON
BY
Joseph P. Gastel
ATTORNEY

United States Patent Office 3,315,519
Patented Apr. 25, 1967

3,315,519
SURGICAL GLOVE LEAK TESTER
William C. Ferguson, Williamsville, N.Y., assignor, by mesne assignments, to American Sterilizer Company, Erie, Pa., a corporation of Pennsylvania
Filed Apr. 13, 1964, Ser. No. 359,119
14 Claims. (Cl. 73—40)

The present invention relates to an improved surgical glove leak tester.

It is mandatory that surgical rubber gloves be free from holes to prevent cross-infection between a doctor and patient. Statistics show that approximately 20% of surgical gloves which have been previously used contain relatively large holes. It has also been found that approximately 8% of brand new gloves contain minute self-sealing holes which do not show up as leaks when the gloves are not stretched but which stretch into sufficiently large holes capable of permitting cross-infection as the gloves are flexed incidental to being worn.

In the past, various leaks testing techniques have been utilized for the purpose of detecting whether a surgical glove contained holes. Among these techniques was the rolling of the cuff closed to thereby entrap air within the glove and thereafter manually manipulating the glove to compress the trapped air and visually determining points of leakage. This technique was extremely time consuming and also was generally inadequate for detecting the above-noted minute holes. Another technique which was utilized was the filling of the glove with water. In addition to being messy, this caused the glove to be stretched an excessive amount and also was time consuming and costly in that the gloves had to be subsequently dried. Another technique which has been utilized in the past was the use of an inflating machine which forced compressed air into an unconfined glove. This technique had the drawback that only the palm portion stretched under inflation and the above-noted minute holes in the fingers did not leak because the fingers were not stretched sufficiently to ovrecome the self-sealing characteristic of the minute holes. Therefore each of the fingers had to be tested separately, and this was a time consuming procedure. The one extremely great shortcoming of all of the above-described techniques was that they required visual observation to determine whether leakage existed, and thus the testing was actually no better than the skill of the person performing the testing, in addition to being an extremely time consuming and therefore costly chore. It is with the overcoming of the foregoing shortcomings of prior art testing techniques that the present invention is concerned.

It is accordingly the primary object of the present invention to provide an improved surgical glove leak testing machine which quickly, efficiently, and automatically tests for the existence of both relatively large and minute holes in all portions of a glove without requiring any visual observation of the gloves or any skill whatsoever on the part of the person operating the machine, thereby providing total testing without the possibility of human error.

Another object of the present invention is to provide an improved surgical glove leak testing machine which subjects the gloves being tested to a relatively high pressure which will cause the leaks due to the existence of heretofore undetectable minute holes to show up, but which does not stretch the gloves appreciably during this process. Other objects and attendant advantages of the present invention will readily be perceived hereafter.

Briefly the improved surgical glove leak tester of the present invention includes a chamber having a holder therein for mounting the cuff of a glove in sealing relationship. The glove is thereafter inflated by compressed air which is supplied to the glove through the holder. The chamber has a door which acts in combination with an opposing wall to confine an inflated glove against excessive expansion. A unique arrangement within the chamber permits the glove to be confined against excessive expansion without causing sealing of holes to be effected incidental to forced contact between the glove and chamber walls. Because the glove is confined in the above manner, it may be subjected to a relatively high pressure to which an unconfined glove could heretofore not be subjected without rupture, to thereby cause leakage through existing minute holes in the glove which would otherwise not leak under lesser degrees of inflation. An automatic electrical control circuit which is triggered by the confining of the inflated glove within the above chamber provides a visual signal in the event that the glove holds said relatively high pressure for a predetermined period of time, to thereby indicate that the glove has neither large nor minute holes. In this specific instance, if the glove holds the relatively high pressure of 15 p.s.i. for 8 seconds, as sensed by the control circuit, it contains no leaks. If the glove has a large hole therein, the above mentioned electrical circuit will provide a visual signal which shows that the glove has a large leak because the glove could not inflate to a predetermined pressure of 15 p.s.i. within a given period of time, namely 3 seconds, as determined by certain timing elements and microswitches in the circuit, as will become apparent in the ensuing parts of this description. In addition, if a glove should have a relatively small leak therein, in the nature of a relatively small hole which would not leak unless the glove was stretched, the glove will become initially inflated to a predetermined relatively high pressure of 15 p.s.i. and thereafter, through a system of microswitches and timing elements, a visual indication will be provided to the machine operator in the event that the initially inflated glove did not hold its relatively high pressure for a predetermined period of time, in this instance approximately 8 seconds, thereby indicating that a slow leak existed. The present invention will be more readily understood when the following portions of the specification are read in conjunction with the accompanying drawings wherein:

FIG. 1 is a perspective view of the instant surgical glove leak tester with the door thereof in the position which it occupies during the actual testing;

FIG. 2 is a perspective view of the instant surgical glove leak tester with the door thereof in the partially open position which it occupies after the actual testing has been completed;

FIG. 9 is a fragmentary elevational view with portions broken away showing the relationship of various portions of the device including the limit switch associated with the chamber in which the glove to be tested is located;

FIG. 10 is a view taken substantially along line 10—10 of FIG. 9;

Figure 4:
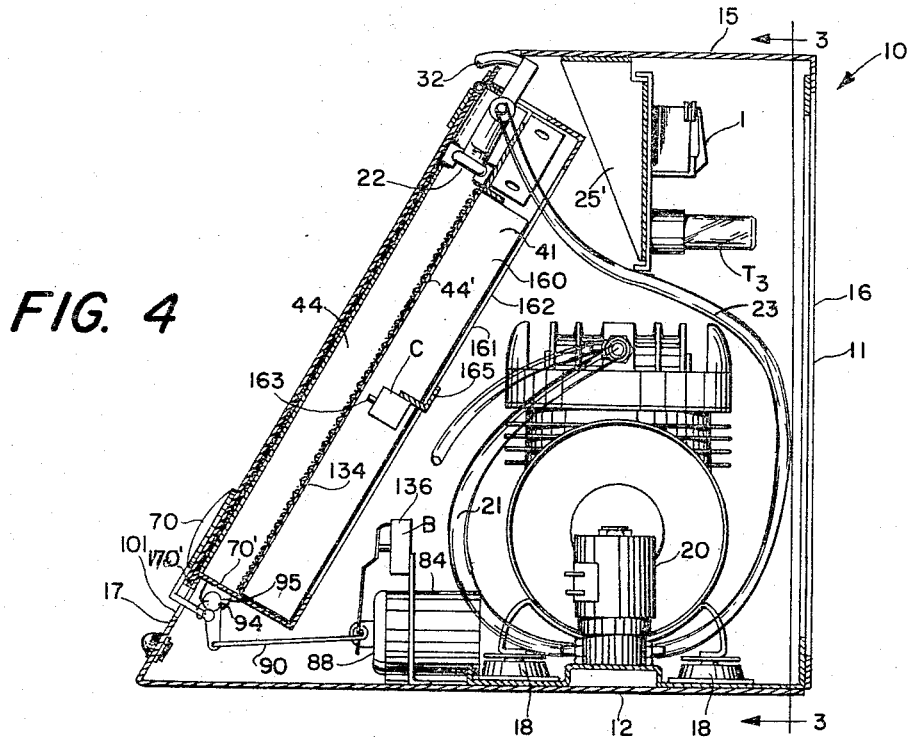
FIG. 4 is a view of the internal portions of the leak tester, said view being taken substantially along line 4—4 of FIG. 3 with certain parts of FIG. 3 omitted in the interest of clarity.

In FIGS. 1, 2, 3, 4, and 7 the general orientation of components of the improved surgical glove leak tester is shown. More specifically, the leak tester 10 includes a housing 11 having a bottom wall 12, a pair of side walls 13 and 14, a top wall 15, a vertical rear wall 16 and a rearwardly sloping front wall 17. Walls 12, 15, 16, and 17 may be fabricated from a single piece of metal which has been suitably cut, bent, and had the ends joined, as by welding. Side walls 13 and 14, which are removable from the remainder of the housing, are secured to flanges 13' and 14', respectively, by means of sheet metal screws 15'. The flanges 13' and 14' extend from opposite sides of walls 12, 15, 16, and 17 and are formed integrally therewith.

Mounted on bottom wall 12 of housing 11 by means of suitable vibration dampening mounts 18 is a compressor 19. The output of compressor 19 is conducted to solenoid valve 20 through conduit 21, and the outlet of solenoid valve 20 is in communication with glove holder 22 through conduit 23. Holder 22 mounts a glove in the manner shown in FIG. 7. A relief valve (not shown), but which may be of the spring biased ball type, is associated with compressor 19 and prevents the pressure therein from ever exceeding 15 p.s.i. Mounted on the bracket 12' secured to compressor 19 is a fan 24 for pumping air through the louvers 25 in the sides 13 and 14 of the housing to thereby prevent the internal components from overheating. An electrical component panel 25' has its upper portion welded, or otherwise suitably secured, to the undersurface of top wall 15 and this panel mounts certain of the relays and certain timer tubes of the electrical system for purposes which will become more apparent hereafter.

Figure 6:
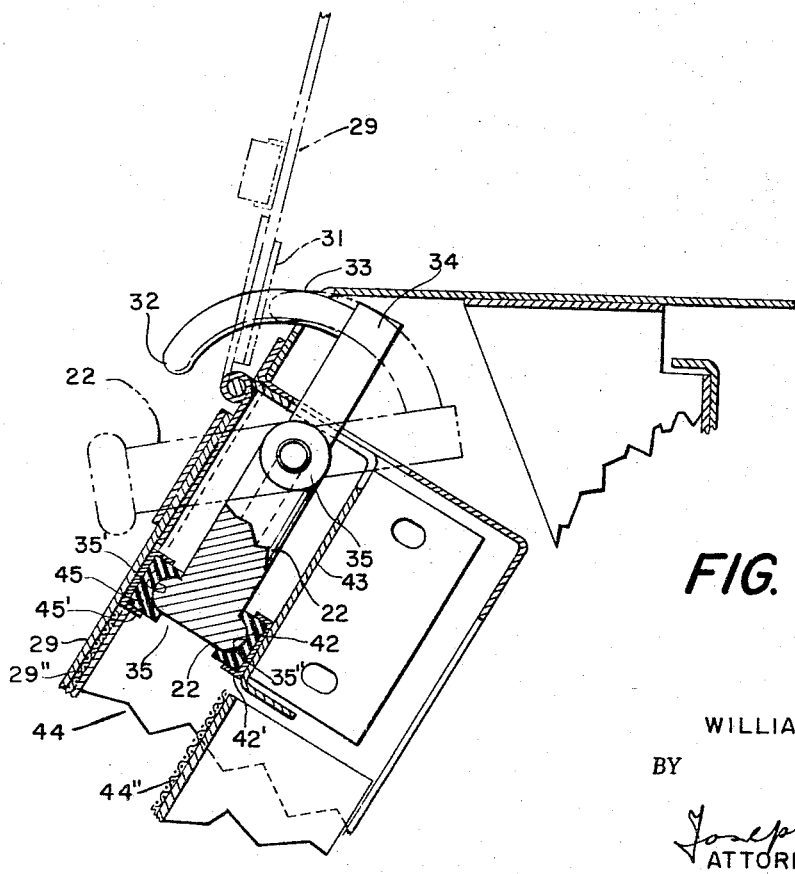
FIG. 6 is a fragmentary view showing the structure for clamping the mouth of the glove in fluid tight relationship with the glove holder.
Figure 7:
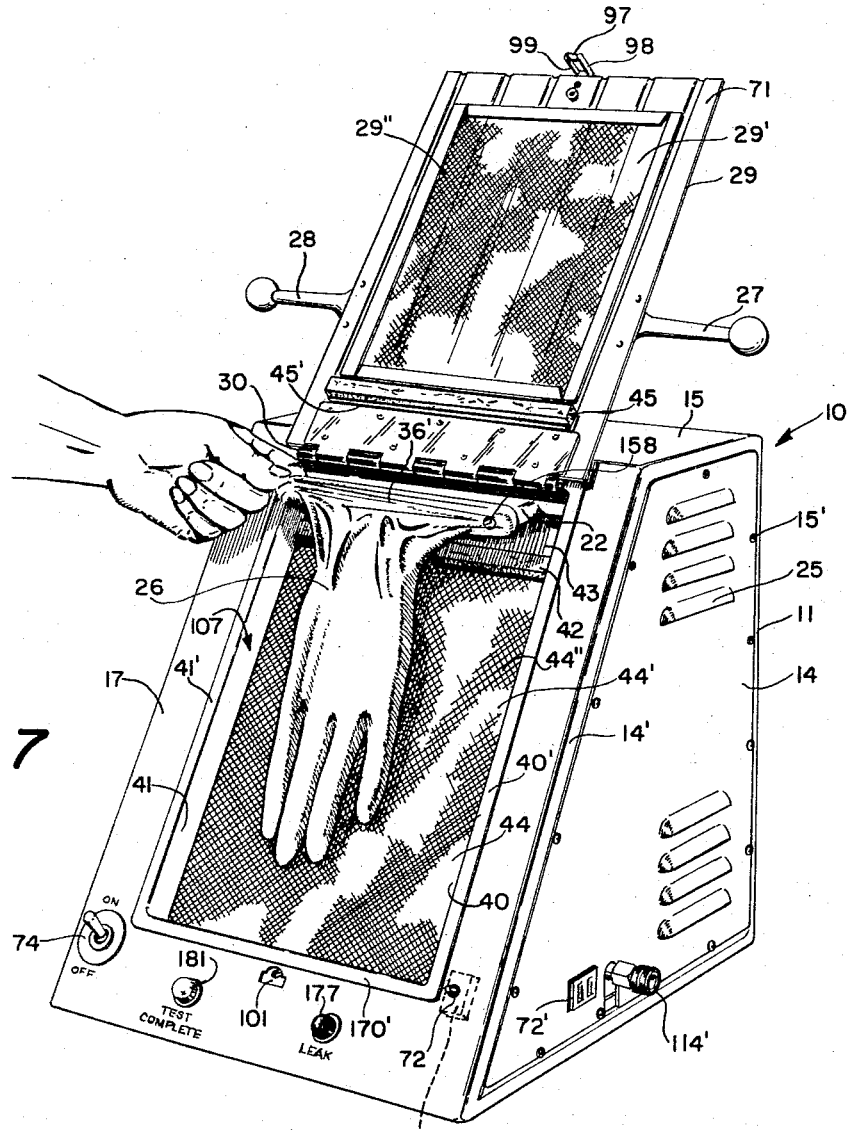
FIG. 7 is a perspective view of the surgical glove leak tester with the door open and a glove being mounted on the glove holder thereof.
Figure 8:
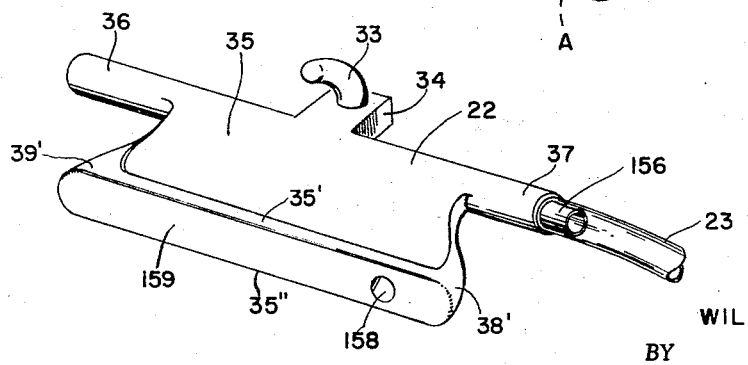
FIG. 8 is a perspective view of the glove holder.

In order to mount a glove 26 (FIG. 7) on leak tester 10 for testing purposes, it is merely necessary for the operator to grasp either of handles 27 or 28 mounted on opposite sides of door 29 and pivot said door to a position shown in FIG. 7 from a position shown in FIG. 2. This pivoting is effected about hinge 30 which secures the upper edge of door 29 to front wall 17 of housing 11. As door 29 is swung from its solid line position to its dotted line position in FIG. 6, a point will be reached where plate 31 engages the end 32 of finger 33 which extends from extension 34 (FIG. 8) of central portion 35 of glove holder 22. Continued swinging of door 29 upwardly to its dotted line position will cause glove mounting fixture 22 to pivot from its solid line position shown in FIG. 6 to its dotted line position shown in FIG. 6 because the ends of central portion 35 of holder 22 are formed into cylindrical pivot members 36 and 37 which are journalled in like mating apertures 38 and 39 (FIG. 9), respectively, in side walls 40 and 41, respectively, of chamber 44 in which the glove is to be mounted, as will become apparent hereafter. The swinging out of holder 22 to the position shown in FIGURE 7 and to the dotted line position shown in FIG. 6 permits the cuff 36' of the glove to be stretched over the glove mounting portion 35' of glove holder 22, as indicated in FIGURE 7.

After the glove has been mounted on glove holder 22 in the above noted manner, the door 29 is swung closed. As door 29 swings counterclockwise in FIG. 6 toward a closed position, the glove holder 22 will pivot to the solid line position shown in FIG. 6 because of the weight distribution tending to cause it to rotate in a counterclockwise direction about its ends 36 and 37. A point will be reached where the glove holder 22 will bear against sponge rubber strip 42 mounted in channel 42' on rear wall portion 43 of chamber 44. A sponge rubber strip 45 is mounted in a channel 45' on the inside of the door and bears against a portion of the holder 22 which is opposite to the portion which bears against strip 42. The strips 42 and 45, which are originally rectangular in cross section, are distorted to the cross sectional configuration shown in FIGURE 6 to effect sealing as a result of pushing door 29 to a closed position.

It is the contour of glove holder 22 in combination with strips 42 and 45 which effects an air tight mounting of the cuff of the glove 26 during inflation of the latter. More specifically, glove holder 22 (FIG. 8) includes lips 35' and 35" on opposite faces thereof, said lips being convexly rounded and the central body portion 35 being indented beyond said lips. The ends 38' and 39' of holder 22 are also convexly rounded and a portion of these ends merges into lips 35' and 35". When the glove 26 is mounted on holder 22 so that the end of the cuff 36' thereof extends across central body portion 35 of holder 22, the lips 35' and 35" and the ends 38' and 39' will receive the cuff portion of the glove with a tight fit. However, after the door is closed so that sponge rubber strips 42 and 45 press against lips 35' and 35", a leakproof seal is produced between the inside of the cuff and the lips of the holder. Furthermore the action of strips 42 and 45 tends to stretch the cuff of the glove toward the center portions of lips 35' and 35" lying between end portions 38' and 39". This causes the cuff portion of the glove to move into tighter sealing relationship with the end portions 38' and 39' which do not have sealing strips such as 42 and 45 pressing against them. It will also be noted that the surfaces of portions 38' and 39' move inwardly toward each other as they approach pivots 36 and 37. This contour also enhances the seal between the cuff of the glove and holder 22. It can thus be seen that the foregoing contour of holder 22 in combination with sponge strips 42 and 45 causes the cuff 36' of glove 26 to be mounted on holder 22 in a thoroughly leak-proof manner to prevent leakage of air which is pumped into said glove through holder 22, as will become more apparent hereafter.

Figure 3:
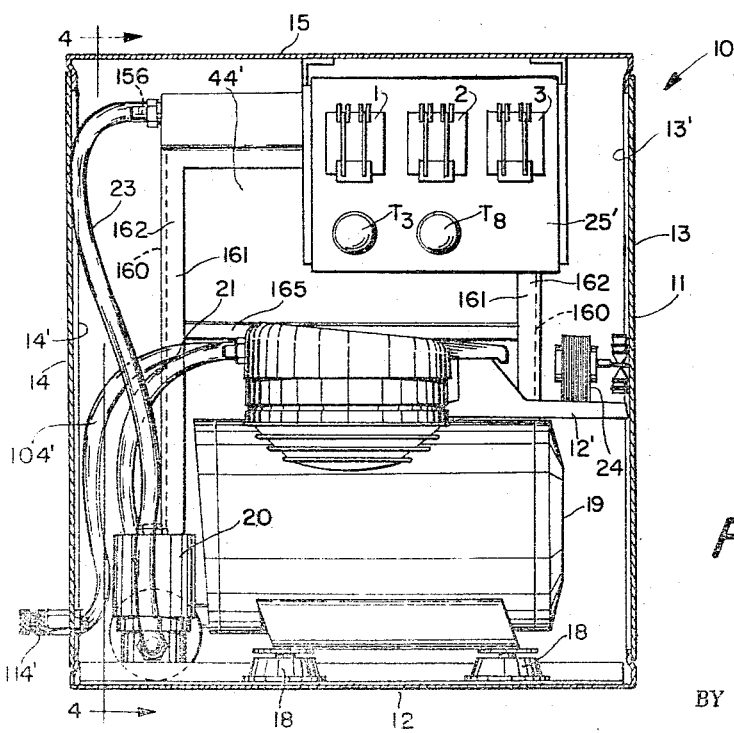
FIG. 3 is a view of the inside of the leak tester taken substantially along line 3—3 of FIG. 4.
Figure 13:
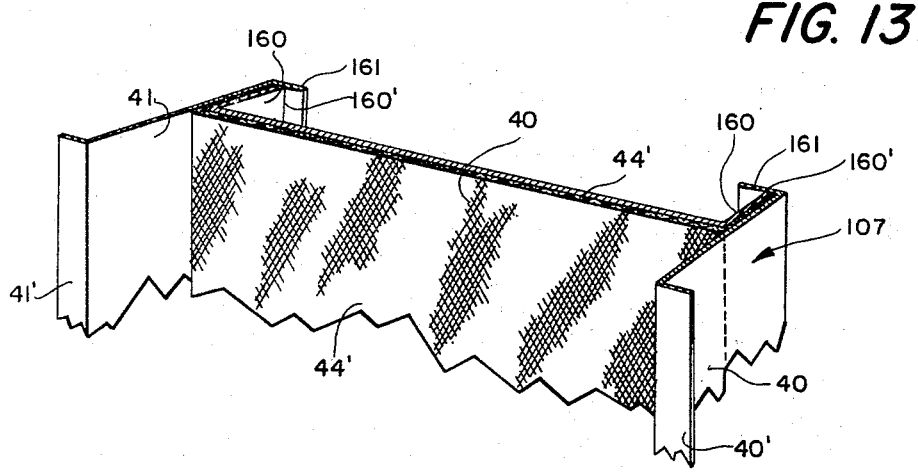
FIG. 13 is a fragmentary perspective view showing the relationship between various components of the glove confining chamber.

Chamber 44 in which glove 26 is mounted for testing consists of a box-like insert 107 which is installed on the face of front wall 17. This box-like insert 107 includes side walls 40 and 41 which terminate at flanges 40' and 41' (FIG. 7), said flanges bearing against front wall 17 as shown, after box-like insert 107 has been inserted in position. Furthermore, box-like insert 107 has a bottom wall 70′ (FIG. 4) having a flange 170′ thereon, as shown in FIG. 7. The edges of side walls 40 and 41 remote from flanges 40′ and 41′, respectively, terminate in flanges 161 (FIGS. 3 and 13). An angle 165 (FIGS. 3, 4, and 9) extends across flanges 161 and mounts microswitch C, which will be discussed at a subsequent part of this description. A flexible backing plate 44′ is formed with side flanges or legs 160 (FIGS. 3, 4, and 13), the edges 160′ of which bear against flanges 161 of box-like member 107. The face of backing plate 44′ and the inside surface of door 29 provide opposing walls for chamber 44 in which glove 26 is confined during inflation, as will become more apparent hereafter.

Figure 5:
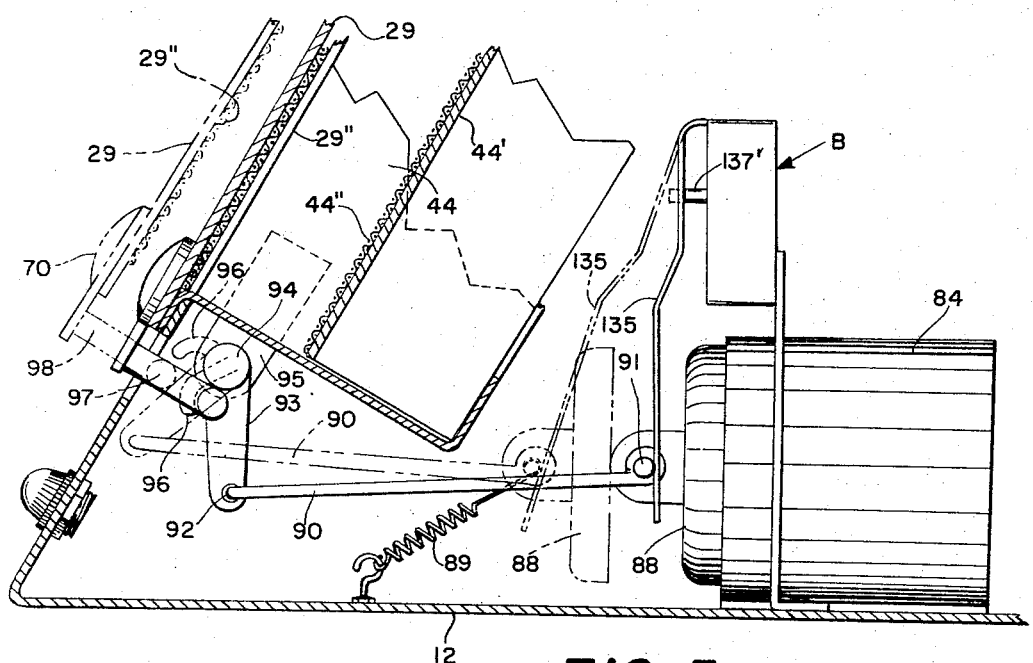
FIG. 5 is a fragmentary view of the glove leak tester showing the manner in which the door latching arrangement operates.

After glove 26 has been inserted into chamber 44 so that it substantially occupies the position shown in FIG. 7, and door 29 has been closed so that it assumes the dotted line position shown in FIG. 5, the testing of glove 26 is ready to commence. At this point it will be noted that the testing is effected to determine whether the glove has no leaks, or whether it has a leak, either large or small. At this point it is to be noted that certain of the small leaks were actually caused by minute bubbles in the latex rubber which were trapped in the gloves during the actual molding process and which subsequently burst. These small holes will not permit air to pass through the glove unless the gloves are inflated to a relatively high pressure. These small holes, which could not be detected by previous testing techniques, cause leakage of the gloves when the gloves are stretched, as when they are worn.

Accordingly, after the door has assumed its dotted line position shown in FIG. 5, the push-to-test button 70 is pushed to cause door 29 to assume the position shown in FIG. 1 at which time an edge portion 71 thereof (FIG. 7) will engage stem 72 of microswitch A, which is suitably mounted on the rear of front wall 17 with stem 72 protruding through the front thereof. Switch A is a double pole, double throw switch which is normally biased to the position shown in FIG. 11. However, when door 29 is momentarily pressed shut and when main switch 74 is closed, a circuit is completed from the voltage source V through lead 75, switch armature 76, lead 77, armature 78 which now bridges contacts 79 and 80, lead 81, lead 82, lead 83, door holding solenoid 84, lead 85, switch armature 86, and lead 87 back to the voltage source. The completion of the foregoing circuit will energize door holding solenoid 84 and cause the armature 88 thereof to move from the dotted line position in FIG. 5 to the solid line position against the bias of spring 89 which extends between armature 88 and an anchoring member secured to bottom wall 12 of the housing. The above movement of armature 88 will be accompanied by the movement of link 90 from its dotted line position to its solid line position. Link 90 has one end thereof pivotally secured to rod 91 which extends laterally from armature 88. The other end of link 90 is pivotally mounted in aperture 92 of bellcrank lever 93 which, in turn, has the central portion thereof fixedly secured to rod 94 which is pivotally mounted on ears 95 depending from side walls 41 and 42 of chamber 44. One leg of bellcrank lever 93 is formed into a latch hook 96, and when link 90 moves from its dotted line position to its solid line position, latch hook 96 will pivot in a counterclockwise direction about the axis of shaft 94 and move around crossbar 97 (FIGS. 5 and 7) which is mounted between arms 98 and 99 secured to door 29, said latch hook 96 fitting through aperture 101 (FIG. 7) in front wall 17 of housing 11.

It will be appreciated, as noted above, that switch 73 is of the type which closes only momentarily while the door 29 is held shut. Therefore as soon as this door is released and it returns to a position in FIG. 5 which is between the solid and phantom line positions because of the clearance between hook 96 and cross bar 97, switch A will return to the position shown in FIG. 11. However, in order to insure that the latch hook 96 maintains door 29 latched, a holding circuit is energized. More specifically, while armature 78 of switch A bridges contacts 79 and 80, a circuit is also established from the voltage source V through lead 75, armature 76, lead 77, armature 78, lead 81, lead 82, relay coil 103, lead 104, contact 105, bimetallic arm 106 of 8-second timer tube T8, lead 108, contact 109, contact 110 in engagement therewith, lead 111, lead 112, armature 86, and lead 87 back to the voltage source V. The energization of relay coil 103 through the above described circuit as a result of the momentary closing of switch A causes armature 113 to be moved downwardly so that contact 114 thereof moves into engagement with contact 115 and contact 116 thereof moves into engagement with contact 117. It will be noted at this point that conacts 114 and 116 are insulated from each other by insulator 118. The foregoing movement of aramature 113 establishes a holding circuit for relay 2 by causing a circuit to be completed from the voltage source through lead 75, armature 76 of switch 74, lead 119, lead 120, contact 114, contact 115 now in engagement with contact 114, solenoid coil 103, lead 104, timer contact 105, bimetallic arm 106, lead 108, closed contacts 109 and 110, lead 111, lead 112, armature 86, and lead 87 back to the voltage source. Since the foregoing circuit holds relay 2 energized by causing the flow of current through coil 103 thereof, door holding solenoid 104 will remain energized because of the flow of current from the voltage source through lead 75, switch armature 76, lead 119, lead 120, contact 114 which is now closed with contact 115, lead 121, lead 83, door holding solenoid 84, lead 85, armature 86, and lead 87 back to the voltage source. Thus door 29 will remain latched because solenoid 84 will remain energized through the above described circuit.

Substantially simultaneously with the energization of the foregoing circuitry and the energization of door holding solenoid 84, relay 1 is energized because a circuit is established from the voltage source through lead 75, armature 76, lead 119, lead 120, contact 114, contact 115 in engagement therewith, lead 82, relay coil 123, lead 124, contact 125 of 3-second timer tube T3, bimetallic arm 127 in engagement with contact 125, lead 128, contact 117, contact 116 in engagement therewith while relay coil 103 is energized, lead 129, contacts 130 and 131 of normally closed microswitch C which is mounted to the rear of flexible plate 44′ forming a wall of chamber 44, as will be described in greater detail hereafter, lead 112, armature 86, and lead 87 back to the voltage source.

As noted above, door holding solenoid 84 was energized through the above described circuit. However, whenever solenoid 84 is energized so as to cause armature 88 to move from its dotted line to its solid line position in FIG. 5, rod 91 which is mounted on armature 88 will cause switch arm 135 to move from its dotted line position to its solid line position in FIG. 5, said switch arm 135 being attached to the top of the housing of microswitch B and being utilized to push stem 137′ of microswitch B from its dotted line position to its solid line position to thereby cause microswitch 136 which is normally open to close substantially simultaneously with the energization of solenoid 84. However the closing of normally open microswitch B is ineffective for completing any circuit at the present time because lead 137 associated with switch B extends between said switch B and contact 138 of relay 1, said contact being out of engagement with armature 139 of relay 1 when relay coil 123 has been energized in the above described manner to cause said armature 139 to move so that contact 140 thereof engages contact 141 and contact 142 thereof engages contact 143.

It is to be noted at this point that whenever relays 1 and 2 are energized in the above-described manner, the heating coils in timer tubes T8 and T3 are energized for the purpose of measuring the length of time for various sequences to occur, as will become more apparent hereafter. More specifically, resistance heating element 145 of timer tube T8 is energized because there is a circuit completed from the voltage source through lead 75, armature 76, lead 119, lead 120, contact 114, contact 115, lead 121, lead 144, resistance heater 145, lead 146, lead 147, lead 148, armature 86 and lead 87 back to the voltage source. Furthermore the resistance heater 149 in timer tube T3 is energized because there is a circuit completed from the voltage source V through lead 75, armature 76, lead 119, contact 140, lead 139, contact 142, contact 143, lead 150, resistance heater 149, lead 151, lead 148, armature 86, and lead 87 back to the voltage source.

After the foregoing circuit has been set up and the timing sequences have been initiated in timer tubes T8 and T3, the normally closed solenoid valve 20 is caused to open to admit compressed air to glove 26 because there is a circuit established from the voltage source through lead 75, armature 76, lead 119, contact 140, lead 139, contact 142, contact 143 with which it is now in engagement, lead 154, solenoid valve 20, lead 155, lead 104, contact 105, bimetallic strip 106 of 8-second timer tube T8, lead 108, contact 109, contact 110, lead 111, lead 112, armature 86 and lead 87 back to the voltage source.

Upon the energization of solenoid valve 20 in the above described manner, communication is permitted between conduit 21 leading from compressor 19 and conduit 23 leading to glove holder 22. More specifically, as can be seen from FIGS. 3 and 8, the end of conduit 23 remote from solenoid valve 20 is mounted on nipple 156 extending from glove holder 22. Furthermore, as can be seen from FIG. 9, said glove holder 22 includes an internal conduit 157 which has an end 158 which terminates on the face 159 of the glove holder 22 so that the compressed air may inflate glove 26.

It will be noted at this juncture that the compressor 19 is capable of providing pressure of the magnitude of 15 p.s.i. and it is this pressure to which glove 26 is subjected. Ordinarily a pressure of this magnitude would cause glove 26 to burst. However the glove is confined between flexible plate 44' of chamber 44 and wall 29' which is a part of door 29. This confining action not only prevents the palm portion of the glove from ballooning out, but by confining it against ballooning out, causes the pressure of 15 p.s.i. in the fingers of the glove to stretch said fingers to the extent where the small holes within the fingers open sufficiently to cause the leakage which would otherwise have been experienced incidental to the flexing of the fingers during wear when the gloves are worn, but which leakage would not have been experienced under low pressure testing conditions because of the self-sealing characteristic of small holes. At this point it is to be noted that the above confining action of glove 26 is effected without sealing any existent holes when the glove expands into contact with flexible plate 44' and wall 29' because each of these are covered by a wire screen 44" and 29", respectively, which permits the confining to be effected without the above mentioned sealing which would otherwise occur if the surfaces of wall 29' and backing plate 44' were smooth.

As can be seen from FIG. 13, plate 44' of chamber 44 is a flexible backing plate and includes a pair of legs 160 (FIG. 3) which bear against flanges 161 extending from sides 40 and 41 forming a part of box-like insert 107 mounted on front wall 17. The backing plate 44' is unsupported except by having the legs 160 bear against flanges 161 and therefore the central portion of plate 44' can flex rearwardly when glove 26 is inflated to engage stem 163 (FIG. 4) of microswitch C which is mounted on angle 165 extending between flanges 161. At this point it is to be noted that a microswitch C is normally closed, as noted above, and this switch opens only when plate 44' is deflected as a result of having been subjected to the pressure of an inflated glove.

Assuming at the present time that the glove 26 which was mounted on fixture 22 has a large leak therein, the compressed air which is supplied thereto in the above described manner will not effect any inflation of glove 26. This being the case, microswitch C will never be deactuated from its normally closed position because flexible backing plate 44' will not deflect to actuate it. Therefore 3-second timer tube T3 will time out to break the holding circuit of relay 1 and as a result there will be an indication that the glove leaks within three seconds after the test was initiated. More specifically, while contact 127' of bimetallic element 127 of tube T3 is in engagement with contact 125, a circuit is completed through relay 1 from the voltage source through lead 75, armature 76, lead 119, contact 140, contact 141, lead 141', coil 123, lead 124, contact 125, contact 127', bimetallic arm 127, lead 128, contact 117, contact 116, lead 129, contact 130, contact 131, lead 112, armature 86, and lead 87 back to the voltage source. However, it will readily be appreciated that as a result of the heat supplied by resistance heating element 149 of 3-second timer tube T3, contact 127' which is mounted on bimetallic arm 127 will move away from contact 125 after three seconds, thereby disrupting the above described circuit and therefore causing relay 1 to move from the position wherein contacts 140 and 142 were in engagement with contacts 141 and 143, respectively, to the position shown in FIG. 11 wherein contact 142 is in engagement with contact 138. As soon as relay 1 opens in the above described manner, relay 3 will be energized because a circuit will be completed from the voltage source through lead 75, armature 76, lead 119, contact 140, lead 139, contact 142, contact 138 now in engagement with contact 142, lead 137, the now closed contacts 167 and 168 of microswitch B, lead 169, lead 170, relay coil 171 of relay 3, lead 172, contact 116, lead 129, closed contacts 130 and 131 of normally closed switch C, lead 112, armature 86, and lead 87 back to the voltage source. From the foregoing it can be seen that the reason that relay 3 is energized is because the 3-second timer tube T3 timed out while the switch C to the rear of flexible plate 44' remained closed and while switch B which was actuated with solenoid 84 also remained closed. This indicated that after the circuit was energized, three seconds elapsed before there was any inflation. In other words, there was no inflation within three seconds after compressed air was supplied to glove 26 and thus the leak within glove 26 was sufficiently large so that there could be no inflation.

Upon the energization of relay 3 in the foregoing manner, armature 173 thereof will be pulled downwardly so that contacts 174 and 110 engage contacts 175 and 176, respectively, to thereby set up the following circuits: First of all, a circuit will be completed through red indicator light 177 which indicates that the glove has a leak. More specifically, this circuit is established from the voltage source through lead 75, armature 76, lead 119, contact 140, lead 120, contact 114, lead 178, contact 174, lead 179, red indicator lamp 177, lead 180, contact 176, contact 110 now in engagement therewith, lead 111, lead 112, armature 86, and lead 87 back to the voltage source.

In addition, a circuit will be established through white indicator light 181 for the purpose of indicating that the test is complete. After relay 3 is energized in the above described manner, relay 2 will be deenergized. More specifically, relay 2 was maintained energized through contacts 109 and 110 of relay 3 when the latter were in engagement. More specifically, in this respect, a circuit had been established from the voltage source through lead 75, armature 76, lead 119, lead 120, contact 114, contact 115 in engagement therewith, lead 121, relay coil 103, lead 104, contact 105, contact 105', bimetallic strip 106, lead 108, contact 109, contact 110, lead 111, lead 112, armature 86, and lead 87 back to the voltage source.

However when relay 3 was energized, armature 173 was pulled downwardly so that contacts 109 and 110 separated to thereby disrupt the circuit to relay 2. When this occurred, armature 118 moved back to the position shown in FIG. 11 wherein contact 114 moved into engagement with contact 114'. When this occurred the following circuit was established to illuminate white light 181 which indicated that the test was complete. More specifically, a circuit was established from the voltage source V through lead 75, armature 76, lead 119, contact 140, lead 120, contact 114, contact 114' now in engagement therewith, lead 182, white light 181, lead 183, lead 148, armature 86 and lead 87 back to the voltage source. Thus the operator of the machine will be apprised of the fact that the glove which was tested had a leak therein because the white light 181 illuminated to show that the test was complete and the red light 177 was illuminated in the above described manner to show that the glove leaked.

Immediately after relay 3 is actuated, the following holding circuit is established through relay coil 171 of relay 3 to thereby maintain armature 173 thereof in a position wherein contacts 174 and 175 are in contact and wherein contacts 110 and 176 are in contact. The circuit which holds relay 3 energized is established from the voltage source through lead 75, armature 76, lead 119, lead 120, contact 174, contact 175 with which contact 174 is in engagement, lead 184, contact 185, armature 186 of switch A, contact 187, lead 188, lead 189, lead 170, relay coil 171, lead 172, lead 129, closed contacts 130 and 131 of normally closed microswitch C behind backing plate 44', lead 112, armature 86, and lead 87 back to the voltage source.

Because relay 2 was deenergized in the above described manner, solenoid 84 which holds the door closed is also deenergized and the solenoid valve 20 is also deenergized. More specifically in this respect, it is to be noted that after contacts 114 and 115 of relay 2 separate as a result of the deenergization of relay coil 103, the circuit to door holding solenoid 84 will be disrupted, that is, current will no longer be able to flow from the voltage source through lead 75, armature 76, lead 119, lead 120, contact 114, contact 115, lead 121, lead 83, solenoid 84, lead 85, armature 86, and lead 87 back to the voltage source. Upon the deenergization of the solenoid 84, door 29 moves from the position of FIG. 1 to the position of FIG. 2, where it is partially open because latch finger 96 moves out of engagement with cross bar 97 (FIG. 5).

Furthermore, solenoid valve 20 can no longer remain energized because it previously received its current through closed contacts 142 and 143 of relay 1 which are now open, as noted above. More specifically, previously the circuit through solenoid valve 20 was established from the voltage source through lead 75, armature 76, lead 119, contact 140, lead 139, contact 142, contact 143, lead 154, solenoid valve 20, lead 155, lead 104, contacts 105 and 105', lead 108, contacts 109 and 110, lead 111, armature 86, and lead 87. However with the deenergization of relay coil 123 of relay 1 and the separation of contacts 142 and 143 of relay 1, solenoid valve 20 is caused to close to thereby terminate the flow of compressed air to glove 26.

The electrical system thus remains in the position above described with relays 2 and 1 in the position shown in the drawing and relay 3 in the position wherein contacts 174 and 110 are in engagement with contacts 175 and 176, respectively. Furthermore, red indicator light 177 and white indicator light 181 are both illuminated to show that the test has been completed and that the glove leaks. This situation exists until such time as another test is initiated by the insertion of a new glove onto glove holder 22 and the closing of the door in the manner described above by pushing button 70 so as to actuate microswitch A. In so doing, armature 186 temporarily loses contact with contacts 185 and 187 in FIG. 11 to thereby disrupt the holding circuit through relay 3 and thereby cause contacts 174 and 110 thereof to return to the position shown in FIG. 11. At the same time, the armature 78 will initiate the sequence of events which energizes relays 2 and 1 in the manner described above. Furthermore, the red indicator light and the white indicator light 177 and 181, respectively, are extinguished because the circuits to them are broken.

Assume at the present time that the glove which is installed on holder 22 is one which leaks slowly, that is, it will inflate to the required pressure but will leak down within 8 seconds after such inflation. The following sequence of events occurs after the door 29 has been pushed closed: Door holding solenoid 84 and solenoid valve 20 are energized, as noted above. Normally open microswitch B is closed in response to the actuation of solenoid 84, as noted above. Relays 2 and 2 are energized, as described in detail above. However, the glove 26 is inflated to a pressure of approximately 15 p.s.i. before three second timer T3 times out, and the pressure of such inflation causes deflection of backing plate 44', as can be seen from FIG. 10, to thereby cause normally closed microswitch C to be opened. (See FIG. 11.)

Upon the opening of normally closed microswitch C the circuit to relay 1 through 3-second timer contacts 127' and 125 is broken inasmuch as the following path is no longer completed, namely, from the voltage source through lead 75, armature 76, lead 119, contact 140, contact 141, lead 141', relay coil 123, lead 124, contact 125, contact 127', bimetallic arm 127, lead 128, contact 117, contact 116, lead 129, contact 130, contact 131, lead 112, armature 86, and lead 87 back to the voltage source. As noted above, this circuit is broken because contacts 130 and 131 of switch C separate upon deflection of backing plate 44'. When this circuit is broken, the circuit through heating coil 149 of 3-second timer 126 is also broken because the circuit can no longer be completed from the voltage source through lead 75, armature 76, lead 119, contact 140, lead 139, contact 142, contact 143, lead 150, resistance heater 149, lead 151, lead 148, armature 86, and lead 87 back to the voltage source because contacts 142 and 143 separate with the deenergization of relay coil 123 of relay 1. Since the 3-second timer is now not being energized, contacts 125 and 127' will not be caused to separate as a result of the heat generated by resistance heater 149 thereby preventing the type of reaction described above in detail wherein the opening of contacts 125 and 127' might cause the red indicator light to show that the glove was bad in the event that said contacts separate to show, as explained above, that no inflation occurred within three seconds of supplying compressed air to glove 26.

In addition, in response to the deenergization of solenoid 1, solenoid valve 20 closes to terminate communication between the source of compressed air and the glove. More specifically, because of the separation of contacts 142 and 143, the circuit previously maintained to solenoid valve 20 is broken. More specifically there is no longer a circuit from the voltage source V through lead 75, armature 76, lead 119, contact 140, lead 139, contact 142, contact 143, lead 154, solenoid valve 20, lead 155, lead 104, contacts 105 and 105', bimetallic armature 106, lead 108, contact 109, contact 110, lead 111, lead 112, armature 86, and lead 87 back to the voltage source V. Thus solenoid valve 20 closes and the air remains trapped in glove 26 if the glove is good. However, if it has a slow leak it will gradually lose air because of the high pressure to which it has been subjected and eventually its loss of air will cause it to shrink and thus permit resilient backing plate 44' to return to a position where it is no longer in engagement with stem 163 of microswitch C.

Assuming that the glove does not have leaks therein, it will hold its inflation at 15 p.s.i. for approximately 8 seconds. It is to be noted again that the 3-second timer T3 dropped out of the circuit with the dropping out of relay 1. However, relay 2 is still energized through the circuit from the voltage source V, lead 75, armature 76, lead 119, lead 120, contact 114, contact 115, lead 121, relay coil 103, lead 104, contacts 105 and 105' of timer T8, bimetallic armature 106, lead 108, contacts 109 and 110, lead 111, lead 112, armature 86, and lead 87 back to the voltage source V. In addition, since there is current flowing through lead 121, the heating element 145 of 8-second timer T8 will also remain energized along with relay 2 through lead 144, resistance heater 145, lead 146, lead 147, lead 148, armature 86, and lead 87 back to the voltage source V, it being appreciated that lead 121 is in electrical conductivity with lead 75 leading from the voltage source. The flow of current through resistance 145 causes bimetallic strip 106 to heat up, and after 8 seconds contacts 105' and 105 will separate to thereby disrupt the circuit through relay 2 to thereby cause the armature 118 consisting of contacts 114 and 116 to return to the position shown in the drawing wherein they are in engagement with contacts 114' and 116', respectively. The door holding solenoid 84 will release latch 96–97 because the former is now deenergized with the deenergization of relay 2 because there is now no longer a circuit through from the voltage source through lead 75, armature 76, lead 119, lead 120, contact 114, contact 115, lead 121, lead 83, door holding solenoid 84, lead 85, armature 86, and lead 87 back to the voltage source V. Furthermore the white light 181 will be illuminated because of the completion of a circuit from the voltage source V through lead 75, armature 76, lead 119, lead 120, contact 114, contact 114', lead 182, white light 181, lead 183, lead 147, lead 148, armature 86, and lead 87 back to the voltage source V. The illumination of white light 181 will show that the test is complete. However, since the door holding solenoid 84 was deenergized, as noted above, and with such deenergization microswitch B returned to a position wherein contacts 167 and 168 separated, there could be no completion of a circuit to relay coil 171 of relay 3, and thus there could be no completion of a circuit to illuminate the red indicator light 177 which would indicate a leak. In other words, the circuit through relay coil 171 could be completed only through microswitch B, but since this switch opened with the door opening solenoid 84 such circuit could not be completed and thus since microswitch C remained with its contacts 130 and 131 apart because the glove retained the air therein after solenoid valve 20 was closed, the illumination of white light 181 to indicate completion of a test without illumination of red light 177 indicated that the glove was good. Stated another way, the glove was proved to be good because it held air for approximately 8 seconds.

However, the situation could arise where after microswitch C opened as a result of the inflation of glove 26, and relay 1 and timer tube T3 were eliminated from the circuit as described in detail above, a slow leak within glove 26 thereafter caused it to deflate prior to the time that the 8-second timer T8 timed out as described above. If the glove deflated, plate 44' would return from its deflected condition and this would cause switch contacts 130 and 131 of switch C to close again. However such closing would be effected before contacts 105 and 105' of 8-second timer T8 opened. Because contacts 105 and 105' are not opened, relay 2 is still energized and therefore door holding solenoid 84 is still energized and microswitch B is closed with contacts 167 and 168 in engagement with each other. This being the case, after contacts 130 and 131 of normally closed switch 132 on the back of the flexible plate 44' close again, a circuit is established from the voltage source through lead 75, armature 76, lead 119, contact 140, lead 139, contact 142, contact 138, lead 137, now closed contacts 167 and 168 of switch B, lead 169, lead 170, relay coil 171 of relay 3, lead 172, contact 116, lead 129, now closed contacts 130 and 131 of backing plate switch C, lead 112, armature 86, and lead 87 back to the voltage source V. The energization of coil 171 of relays 3 causes armature 173 to move downwardly so that contact 174 engages contact 175 and contact 110 engages contact 176. Thus a holding circuit will be established for relay 3 from the voltage source through lead 75, armature 76, lead 119, lead 120, lead 178, contact 174, contact 175, lead 184, contact 185, armature 186, contact 187, lead 188, lead 189, lead 170, relay coil 171, lead 172, lead 129, contact 130, contact 131 which is in contact with contact 130, lead 112, armature 86, and lead 87 back to the voltage source V. Furthermore the red light 177 will go on because a circuit is now established from the voltage source V through lead 75, armature 76, lead 119, lead 120, lead 178, contact 174, lead 179, light 177, lead 180, contact 176, contact 110 now in engagement with contact 176, lead 111, lead 112, armature 86, and lead 87 back to the voltage source. Thus, where the leak in glove 26 is a slow one, the red and white lights will both illuminate to show that the test is complete and that the glove has a leak therein, albeit a slow one. It will be appreciated that the standards are such that if the glove bleeds down from 15 pounds pressure within 8 seconds so as to permit contacts 130 and 131 of microswitch C to close, then the glove is not satisfactory for use. The holding circuit through relay 3 will remain energized to thereby cause both the red and white lights to remain illuminated until microswitch 73 is again actuated.

It will be appreciated that a situation can arise where the slow leak within glove 26 is sufficiently slow so that it will permit the glove to be inflated and thus deflect plate 44' and therefore cause separation of contacts 130 and 131 of switch C. However, the slow leak may be sufficiently fast so that the glove 26 deflates prior to the time that timer T3 times out. Thus a situation exists where upon the reclosing of contacts 130 and 131 of switch C a circuit may be again reestablished through coil 123 of relay 1 at the same time that a circuit is established through coil 171 of relay 3. However, relay 3 operates at a lower voltage than relays 1 and 2 and therefore the establishment of a circuit through relay 3 will cause relay 2 to drop out of the circuit and thereby prevent the establishment of a circuit through relay 1. In this particular instance relay 3 will operate at 40 volts whereas relays 1 and 2 operate at 110 volts.

More specifically in the foregoing respect, upon the reclosing of contacts 130 and 131, while contacts 125 and 127 of timer T3 remain closed, there is a tendency (which is not achieved) to complete a circuit through relay coil 123 of relay 1 from the voltage source through lead 87, armature 86, lead 112, contacts 131 and 130, lead 129, contact 116, contact 117 in engagement therewith, lead 128, armature 127, contacts 127' and 125, lead 124, relay coil 123, lead 82, lead 121, contact 115, contact 114, lead 120, lead 119, armature 76 and armature 75 back to the voltage source. It will be noted that in order to establish the foregoing circuit, contacts 116 and 117 of relay 2 are in engagement with each other and also contacts 114 and 115 are in engagement with each other. In addition there will be a tendency to establish a circuit through relay coil 171 of relay 3 from the voltage source through lead 87, armature 86, lead 112, now closed contacts 131 and 130 of switch C, lead 129, lead 172, relay coil 171, lead 170, lead 169, closed contacts 167 and 168 of switch B, lead 137, contact 142, lead 139, contact 140, lead 119, armature 76 and lead 75 back to the voltage source. However as noted above, relay 3 will operate at a lower voltage than relays 1 and 2 upon the energization of relay 3 through the above described circuit relay 2 will drop out of the circuit. However as noted above, the circuit, in order to be effective to relay coil 123 of relay 1, must be established through closed contacts 114 and 115 and 116 and 117 of relay 2. However since relay 2 opens to cause separation of the foregoing contacts with the energization of relay 3, the circuit through relay 1 can never be established. Thus even though possible circuits are established to relays 1 and 3 at the same time under the situation where switch C closes before timer T3 times out, the difference in voltage at which relays 3 and 1 energize prevents such occurrence from actually materializing.

Figure 11:
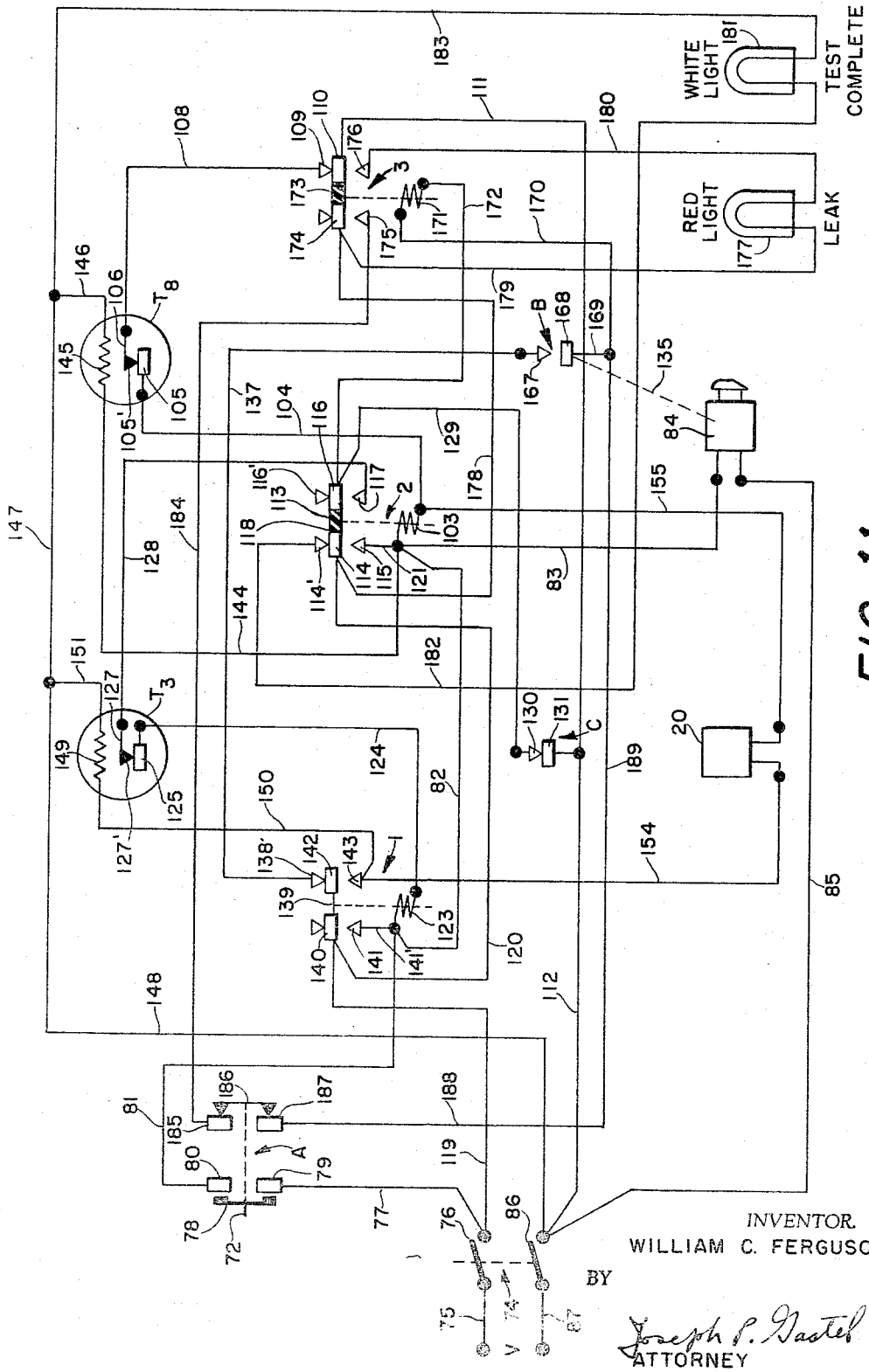
FIG. 11 is a wiring diagram of the leak tester of the present invention.
Figure 12:
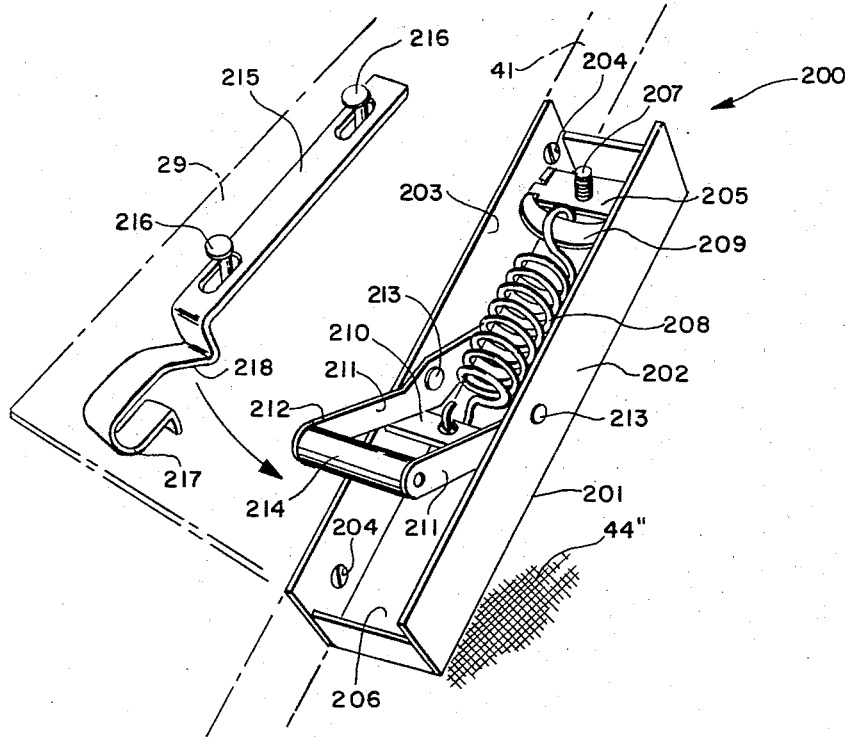
FIG. 12 is a view of the latching arrangement for the door which prevents the door from flying up at the completion of a test.

In FIGURE 12 a latching arrangement 200 is shown for use with the embodiment of FIGURES 1 to 13 in preventing door 29 from flying outwardly after solenoid 84 is deenergized to release door latch 96–97. It will be appreciated that latching arrangement 200 has been omitted from the preceding figures in the interest of clarity and simplicity but that such an arrangement forms a part thereof. The latching arrangement 200 includes a box-like portion 201 having side walls 202 and 203, the latter having apertures 204 therein for receiving screws which affix box-like portion 201 to side wall 41 of chamber 44. The latch includes a bracket 205 which is rigidly affixed to rear wall 206 of box-like portion 201 by screw 207. One end of helical spring 208 encircles tongue 209 of bracket 205 and the other end of spring 208 is received in cross member 210 secured to opposite arms 211 of latch member 212, said arms 211 being pivotally mounted to side walls 201 and 203 by rivets 213. A roller 214 extends between the ends of arms 211 and latch member 212 is mounted so that it assumes the position shown in FIGURE 12 when door 29 is opened and assumes a position within box-like member 201 when door 29 is closed. Spring 208 is mounted in over-center relationship to latch member 212 to cause it to assume the above described positions.

A keeper 215 is mounted on the inside of door 29 by bolts 216 and the lower end of keeper 215 is formed into hook 217. As the door closes, surface 218 of keeper 215 strikes roller 214 and in pushing it downwardly causes the spring 208 to go over center whereupon roller 214 will snap into the hook portion 217 of keeper 215 to thereby cause door 29 to be latched shut. It is to be noted however that there is a certain amount of play available in door 29 after the above described latching action has taken place to permit it to be pushed into a position where it can actuate microswitch A (FIGURE 7) as described above.

After the glove testing cycle has been completed so that latch hook 96 becomes disengaged from cross bar 97 in response to deactuation of solenoid 84, latch 200 will prevent door 29 from flying open under the urging of the inflated glove 96 within chamber 94. More specifically the pressure of the glove on the inside surface of door 29 will cause it to fly up. However, the action of hook 217 on roller 214 will prevent it from doing so because of the engagement therebetween and the only way in which door 29 can be opened is by actually manually engaging handles 27 and 28 and causing pivotal movement of latch member 212 about rivets 213 in response to the opening movement of door 29, said pivotal movement of latch member 212 continuing until such time as roller 214 can disengage from hook portion 217. It will be appreciated of course that any other simple type of latch mechanism may be employed to achieve the foregoing end.

In FIGURES 14 to 21 an alternate embodiment of the present invention is disclosed. This embodiment has the same electrical circuit as shown in FIGURE 11 except for certain modifications which will be set forth hereafter. The embodiment of FIGURES 14 to 21 differs from the preceding embodiment primarily in the manner of fastening door 220 to the remainder of the glove tester housing 221. More specifically, the main difference between the instant and preceding embodiment lies in the fact that door 220 may be opened by the manipulation of handle 222 rather than by the manipulation of handles such as 27 and 28 of FIGURE 7.

Door 220 is hinged to housing 221 by hinge 223. The front plate 224 of housing 221 has slots 225 therein through which latch hooks 226 protrude, said latch hooks being rigidly secured to shaft 227 which is journalled at opposite ends thereof in brackets 228 and 229 which in turn are secured to the bottom wall 230 of housing 221. A torsion spring 231 (FIGURE 16) has one end thereof affixed to bracket 228 and the other end thereof in engagement with the lower surface of one end of latching books 226 to thereby tend to bias shaft 227 in a clockwise direction in FIGURE 15 so that latch hooks 226 are in the solid line position shown in FIGURE 14 with the upper surfaces 232 thereof in engagement with the upper edges of slots 225. In this position latching hooks 226 hold door 220 closed.

Figure 15:
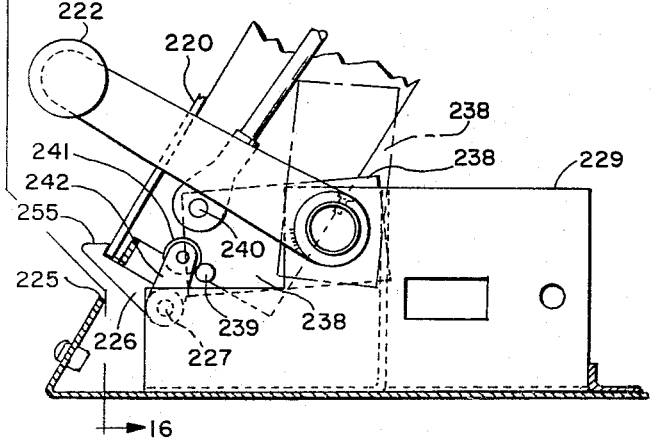
FIG. 15 is a fragmentary view similar to FIG. 14 but showing other linkage which was omitted from FIG. 14.
Figure 16:
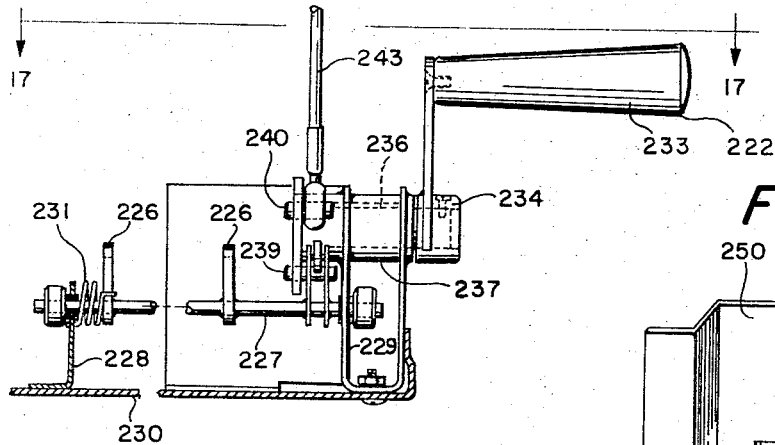
FIG. 16 is a view taken substantially along line 16—16 of FIG. 15 with certain elements omitted in the interest of clarity.
Figure 20A:
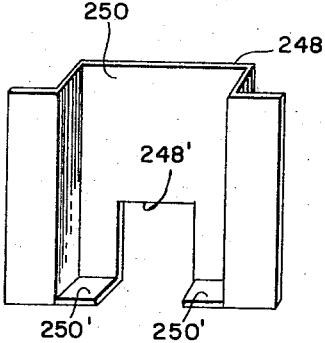
FIG. 20(a) is a perspective view of a bracket associated with the door opening linkage.
Figure 17:
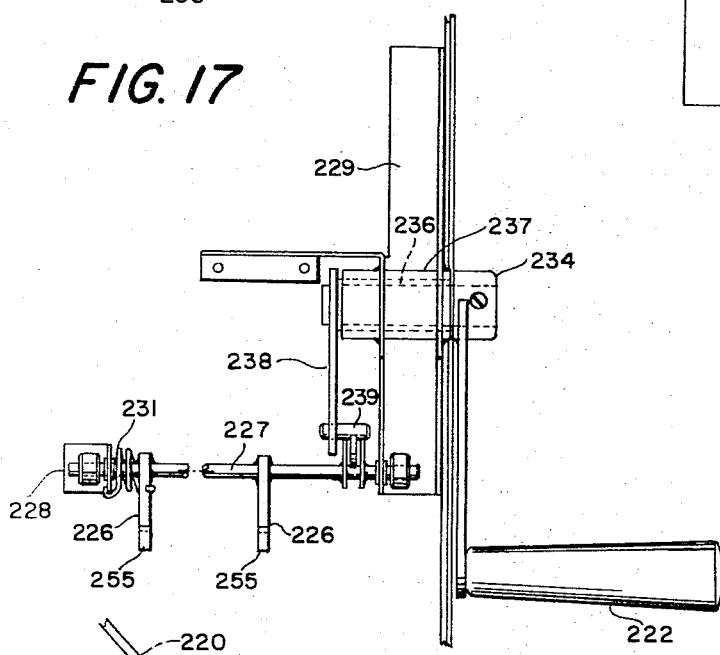
FIG. 17 is a view taken substantially along line 17—17 of FIG. 16 with certain elements omitted in the interest of clarity.
Figure 20B:
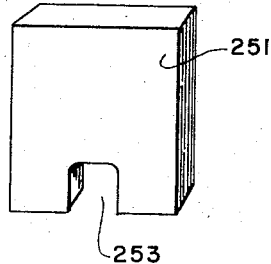
FIG. 20(b) is a perspective view of a sliding block which is mounted in the bracket of FIG. 20(a)
Figure 18:
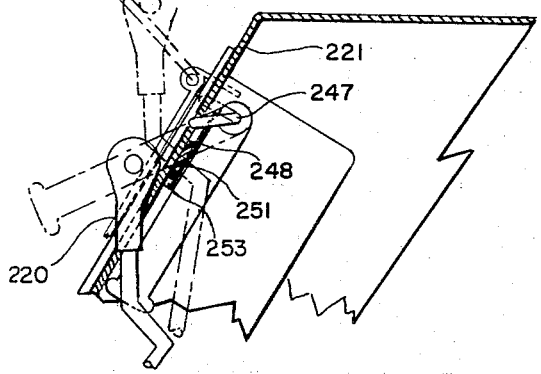
FIG. 18 is a detail view taken substantially along line 18—18 of FIG. 19.
Figure 19:
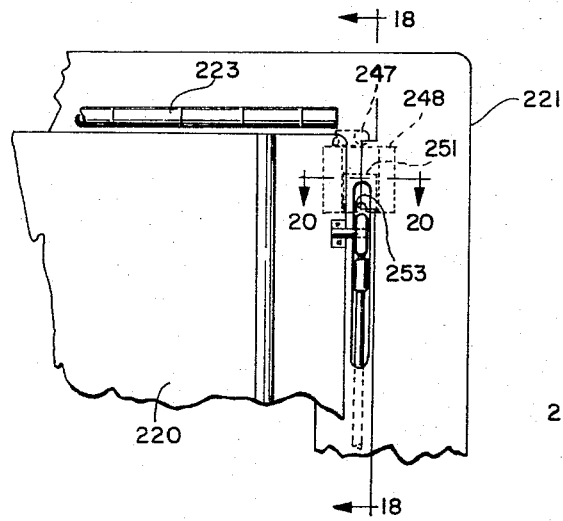
FIG. 19 is a fragmentary view of a portion of the front of the glove tester and showing a portion of the linkage for opening a door.
Figure 20:
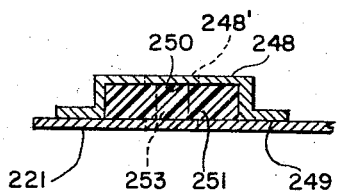
FIG. 20 is a view taken substantially along line 20—20 of FIG. 19.

In the event that it is desired to open door 220 it is merely necessary to manipulate handle 222 to cause it to rotate in a clockwise direction in FIGURE 15. Handle 222 includes a handle portion 233, which is grasped by the testing machine operator, and a mounting portion 234 connected thereto by a central portion 235. Mounting portion 234 is mounted onto shaft 236 extending through the side wall of housing 221 and is journalled for rotation within bearing 237 mounted on bracket 229 (FIGURE 16). The portion of shaft 236 remote from mounting portion 234 has an arm 238 rigidly secured thereto. Arm 238 is rectangular as shown in FIGURE 15 and has pins 239 and 240 extending therefrom toward handle 222. Plate 238 occupies the position shown in FIGURE 15 when door 220 is latched closed.

In order to open door 220 handle 222 is rotated in a clockwise direction in FIGURE 15 so that pin 239 engages roller 241 mounted at the end of arm 242 which is rigidly affixed to shaft 247. Thus latch 226, shaft 227 and arm 242 essentially act as a bellcrank lever so that as pin 239 moves upwardly and engages roller 241, the interference therebetween will cause a pivotal movement of shaft 227 in a counterclockwise direction to thereby lower latching hooks 226 from the solid line position shown in FIGURE 14 to the dotted line position shown therein. Therefore the first increment of rotation of handle 222 will unlatch door 220.

Figure 14:
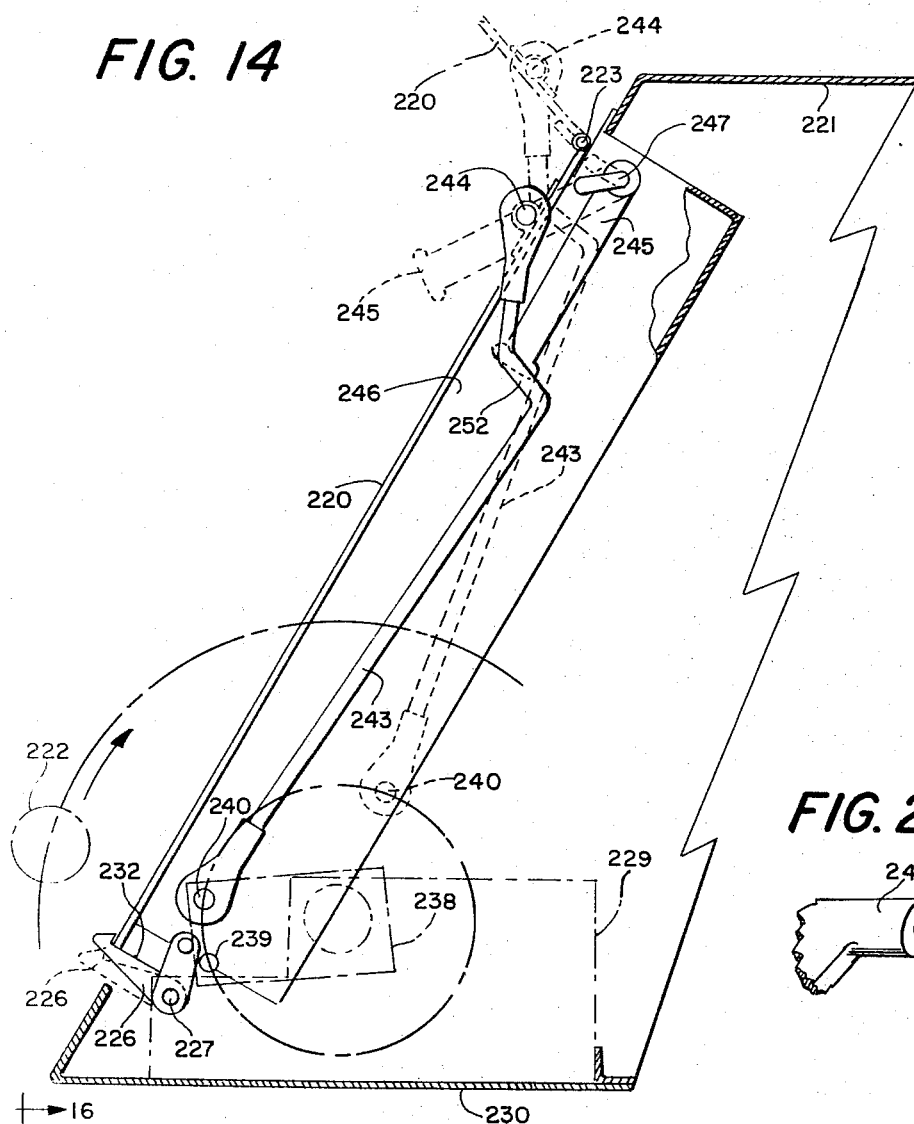
FIG. 14 is a view partially in cross section of a modified embodiment of the present invention and showing particularly certain linkage elements for opening and closing a glove tester door, certain other linkage elements having been omitted in the interest of clarity.
Figure 21:
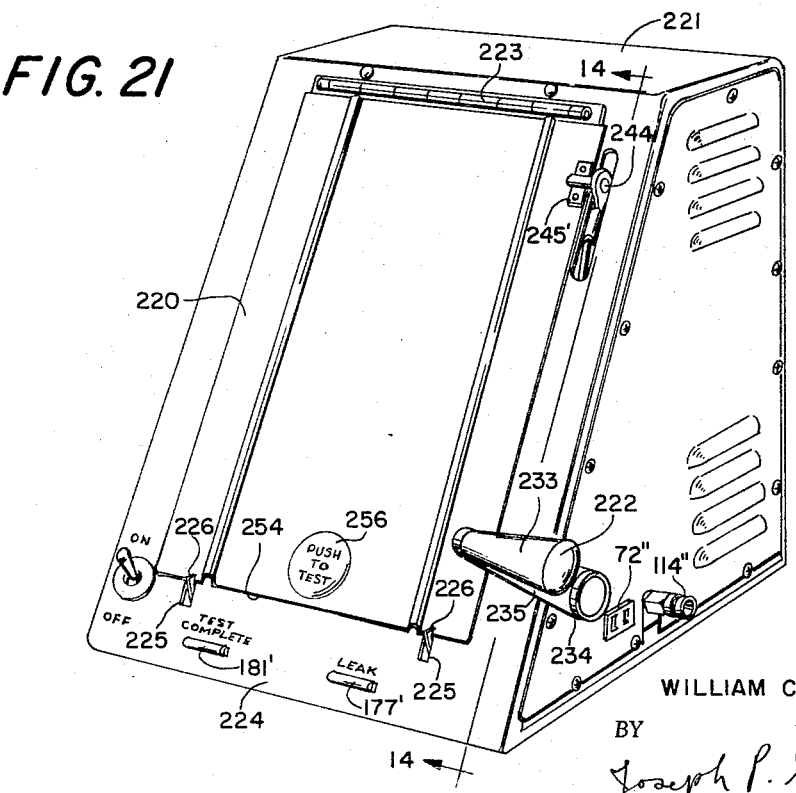
FIG. 21 is a perspective view of the housing for the glove tester of the embodiment of FIGS. 14–21.

Continued rotation of handle 222 in a clockwise direction will cause a continued rotation of plate 238 in a clockwise direction also and cause pin 240 to move from the solid line position shown in FIGURE 14 to the dotted line position shown therein. An elongated link 243 has one end thereof pivotally mounted on pin 240 and the other end thereof pivotally mounted on pin 244 which is secured to door 220 by bracket 245' (FIGURE 21). As clockwise direction of handle 222 continues, link 243 will move upwardly from the solid line position shown in FIGURE 14 to the dotted line position shown therein and in so doing will move door 220 from its solid line position to its dotted line position about hinge 223.

It is to be noted that a glove holder 245, which is analogous to holder 22 of the other embodiment, is pivotally mounted within chamber 246 which may be identical in all respects to chamber 44 of the previous embodiment. Therefore a detailed description of the chamber and its associated structure will not be made at this point inasmuch as it is deemed superfluous.

Figure 20C:
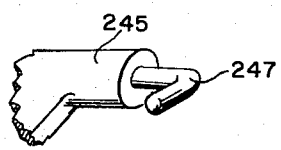
FIG. 20(c) is a fragmentary perspective view of the portion of the glove holder showing the arm which is engaged by the block of FIG. 20(b)

Holder 245 differs from holder 22 in that it is moved to its glove mounting position, shown in dotted lines in FIG. 14, in a different manner than the glove holder 22. More specifically, the ends of glove holder 245 are pivotally mounted in the same manner as holder 22. However, an arm 247 extends laterally from holder 245 toward housing 248 (FIGS. 18 and 19) mounted on the inside of front wall 224 of housing 221. Housing 248 is made of bent metal and essentially provides a rectangular slot 250 in which block 251 freely floats. Tabs 250' formed at the bottom of housing 248 prevent block 251 from dropping out. As link 243 moves from its solid line position to its dotted line position in FIG. 14 the central bent portion 252 thereof will move up under block 251 and is received within slot 253 which permits portion 252 to slide relative thereto. The rear of housing 248 has a slot 248' which permits link portion 252 to engage block 251. However, as link 243 moves to its dotted line position in FIG. 14, block 251 is raised up into engagement with arm 247 (FIG. 20(c)) and causes it to pivot in a clockwise direction about the center line of the pivotal mounting of holder 245 to thereby cause holder 245 to move to its dotted line position shown in FIG. 14. The compressed air inlet to holder 245 is similar to that of holder 22 except that it is mounted on the end of holder 245 which is opposite to the end on which arm 247 is mounted. The remaining structure of holder 245 may be identical to that described above with respect to holder 22.

It is to be noted that when link 243 has reached its dotted line position pin 240 has gone over center with respect to the center of shaft 236 (on which handle 222 is mounted) and pin 244 which secured link 243 to door 220. Thus the glove tester operator may release handle 222 and door 220 will remain open.

When it is desired to close door 220, after a glove has been mounted on holder 245 in the same manner as noted above with respect to holder 22, it is merely necessary to manipulate handle 222 to cause it to move in a counterclockwise direction in FIG. 15. This will cause pin 240 to move over center and after such movement has been effected and link 243 drops away from its dotted line position the weight of holder 245 will cause it to pivot in a counterclockwise direction to return to its solid line position within chamber 246. Furthermore, the weight of door 220 now causes it to pivot in a counterclockwise direction (FIG. 14) about hinge 223. This movement will continue until the lower edge 254 of door 220 engages the top cam surfaces 255 of latch hooks 226 and forces them to pivot in a counterclockwise direction about the axis of shaft 227 against the bias of spring 231 until such time as contact is lost between edge 254 and cam surfaces 255 whereupon spring 231 will bias latching hooks 226 to the locking position shown in FIGURE 15.

It will be appreciated that a microswitch (not shown) which is analogous to microswitch A is mounted on housing front plate 224 for engagement by an inside surface of door 220 when it is pushed on the push-to-test area 256. After the door is released it will spring back to a position where it no longer actuates the microswitch. It will be appreciated of course that the microswitch is actuated in the same manner as microswitch A of FIGURE 11.

However, as noted briefly above, the embodiment of FIGURES 14 to 21 differs from the previous embodiment in the following respects. Since the latching is effected by latching hooks 26 under the urging of torsion spring 231, as described in greater detail above, there is no need for the action of a latching solenoid such as 84 (FIGURE 5) and its associated linkage 93, etc. However, it is still necessary to energize a microswitch such as B (FIGURES 5 and 11) for the purposes enumerated above with respect to FIGURES 1 to 13. Therefore a solenoid, such as 84, is incorporated into the embodiment of FIGURES 14 to 21 but the door latching linkage is not associated therewith. A microswitch such as B is associated therewith and the function of solenoid 84 is to actuate microswitch B in the proper sequence during the energization of the circuit of FIGURE 11. Aside from the above described modification of the circuit of FIGURE 11 in the embodiment of FIGURES 14 to 21 there are no other changes in the circuit of FIGURE 11.

Furthermore, it will be understood that all parts of the embodiment of FIGURES 14 to 21 which were not specifically described as being different from the embodiment of FIGURES 1 to 13 may be the same as that shown in the embodiment of FIGURES 1 to 13 except for the structure of FIGURE 12 which has been eliminated from FIGURES 14 to 21 because it is not needed.

In FIGURE 7 it can be seen that the glove tester has an electrical outlet 72' and a compressed air hose 114' extending to the outside. These items are merely by way of convenience to permit an electrical appliance to be plugged into socket 72' and to permit a compressed air takeoff from air hose 114'. Air hose 114' may include a ball check type of valve therein which prevents leakage from hose 114' unless a hose is plugged into it with a suitable jack. Any other type of arrangement may be associated with hose 114' for preventing leakage. As can be seen from FIGURE 3 hose outlet 114' is in communication with compressor 19 through conduit 104'. The embodiment of FIGURES 14–21 has similar electrical outlet 72" and hose outlet 114". In addition, the embodiment of FIGURES 14–21 possesses signal lamps 177' and 181' (FIGURE 21) which are analogous to lamps 177 and 181, respectively, of FIGURE 7.

While the various embodiments of the present invention have been disclosed as having a self-contained compressor therein, it will be appreciated that the compressor may be eliminated and that a suitable conduit connection may be provided either within the housing or protruding therefrom for the purpose of receiving a conduit leading from another source of compressed air of proper pressure.

It can thus be seen that the present glove tester is manifestly capable of achieving the above enumerated objects and while preferred embodiments of the present invention have been disclosed it may be otherwise embodied within the scope of the following claims.

I claim:
1. A surgical glove leak tester comprising a housing, a chamber in said housing for receiving a surgical glove having a cuff, a holder in said chamber for insertion into the cuff of said glove, means in said chamber for engaging outside portions of the cuff on said glove mounted on said holder to thereby effect an air-tight connection between said holder and said cuff of said glove, means operatively associated with said holder for conducting pressurized fluid through said holder for inflating said glove, and means in said chamber adapted to overlie to engage two opposite sides of the entire glove for confining said glove against expanding an amount which would normally be commensurate with the pressure of the pressurized fluid supplied thereto which is sufficient to cause leakage through minute holes in said gloves.

2. A surgical glove leak tester comprising a housing, a chamber in said housing for receiving a surgical glove having a cuff, a holder for mounting the cuff of said glove, means associated with said holder for conducting pressurized fluid to the glove mounted thereon, wall means adapted to overlie to engage two opposite sides of the entire glove forming a part of said chamber for limiting the expansion of said glove when said pressurized fluid is conducted thereto, and means for causing said holder to occupy a first position within said chamber when said pressurized fluid is being supplied thereto during the testing of said surgical glove and for causing said holder to occupy a second position for facilitating the mounting of said cuff thereon.

3. A surgical glove leak tester as set forth in claim 2 wherein said wall means includes a door forming a part of said chamber, means mounting said door for causing said door to be moved to an open position to thereby permit the mounting of said cuff on said holder and for permitting the movement of said door to a closed position to act in confining said glove during inflation, and linkage means operatively coupling said holder and said door to cause said holder to automatically move to said second position when said door is opened to thereby facilitate the mounting of said glove on said holder and for causing said holder to move to said first position when said door is closed.

4. A surgical glove leak tester comprising a housing, a chamber in said housing, a holder within said chamber for mounting the cuff of a surgical glove in sealing relationship, said holder being elongated and having a lengthwise dimension which is longer than its crosswise dimension, first convexly curved lip portions lying substantially parallel to each other and being located along the lengthwise dimension of said holder at peripheral edge portions thereof, second convexly curved portions extending along the crosswise dimension of said holder and joining the ends of said first convexly curved lip portions, the perimeter of said first and second convexly curved portions being in excess of the perimeter of a normally unstretched glove cuff whereby the mounting of said glove cuff on said first and second portions of said holder tends to provide a sealing relationship between said holder and said cuff, and conduit means extending within said holder for conducting compressed fluid to a glove mounted thereon.

5. A surgical glove leak tester as set forth in claim 4 wherein said chamber includes a pair of opposed wall portions mounted on opposite sides of said holder in contiguous relationship to said first convexly curved portions, sealing strip means on said opposed wall portions for engaging the cuff of a glove mounted on said holder in opposition to said first convexly curved lip portions to thereby cause portions of said glove mounted on said first convexly curved lip portions to be clamped between said portions and said strip means.

6. A surgical glove leak tester comprising a housing, a compressor in said housing for providing compressed air of a predetermined pressure, a chamber in said housing for receiving a surgical glove having a cuff, a holder in said chamber for mounting the cuff of said glove in sealing relationship, means for causing said compressed air to be selectively supplied to the inside of said glove to thereby effect inflation of said glove,, said chamber including an irregular facing for confining said glove against expansion without affecting a sealing relationship therewith to thereby permit leakage through existing small holes in said glove.

7. A surgical glove leak tester as set forth in claim 6 wherein said irregular facing comprises wire mesh screening mounted in contiguous relationship with the walls of said chamber which confine said glove.

8. A surgical glove leak tester comprising a housing, a chamber in said housing, a holder in said chamber for mounting the cuff of said glove in sealing relationship, conduit means associated with said holder for conducting pressurized fluid to said glove, first circuit means for sensing when said glove reaches a predetermined degree of inflation, second circuit means for sensing whether said glove will maintain said predetermined degree of inflation for a predetermined period of time, and signal means for indicating whether or not said glove will retain said predetermined degree of inflation for said predetermined period of time.

9. A surgical glove leak tester comprising a housing, a chamber in said housing for receiving a surgical glove having a cuff, a holder for mounting the cuff of said glove, a handle mounted on said housing, a door on said housing, means operatively coupling said handle and said door to cause said door to be moved to an open or a closed position in response to the manipulation of said handle, means for moving said holder to a first position in response to the opening of said door for facilitating the mounting of a cuff of said glove thereon and for moving said holder to a second position within said chamber in response to the moving of said door to said closed position, and latch means mounted on said housing for latching said door in said closed position.

10. A surgical glove leak tester as set forth in claim 9 wherein said door forms a wall of said chamber in said closed position, and irregular surfaces on the inside surface of said door and the wall of said chamber in opposition thereto for confining said glove against expansion during inflation thereof without sealing minute holes therein.

11. A surgical glove leak tester comprising a chamber having opposed wall portions, a holder in said chamber for mounting the cuff of said glove in sealing relationship, conduit means in said holder for admitting pressurized fluid to said glove located between said opposed walls of said chamber, irregular surfaces on said opposed walls for confining said glove from expanding an amount commensurate with the pressure of said pressurized fluid while permitting leakage through minute holes which are stretched from their self-sealing condition in response to the existence of said fluid pressure, first circuit means for sensing when said glove reaches a predetermined degree of inflation, second circuit means for providing a first signal in the event that said glove maintains said predetermined degree of inflation for a predetermined period of time, and third circuit means for providing a second signal if said glove does not maintain said predetermined degree of inflation for said predetermined period of time.

12. A surgical glove leak tester for testing whether a glove has no leak, a small leak, or a large leak comprising a housing, a chamber in said housing, a holder in said chamber for receiving the cuff of said surgical glove in sealing relationship, a source of fluid pressure in said housing, means for effecting communication between said source of fluid pressure and said holder to thereby provide fluid pressure for inflation of said glove, a movable door operatively associated with said housing for confining said glove against excessive expansion when subjected to said fluid pressure, first circuit means operable in conjunction with said means for effecting communication between said source of fluid pressure and said holder for effecting inflation of said glove, second circuit means for timing the length of inflation of said glove, first signal means operatively associated with said second circuit means for providing an indication in the event said glove does not retain fluid pressure for a predetermined relatively short period to thereby provide an indication that said glove has a relatively large leak therein, and third circuit means operatively associated with said signal means for providing an indication in the event said glove has a relatively small leak and therefore is incapable of retaining fluid pressure therein for a relatively long time but is capable of retaining said fluid pressure therein for a period of time which is longer than said relatively short time.

13. A surgical glove leak tester comprising a housing, a chamber in said housing, a holder for receiving a cuff of a glove in sealing relationship, means for conducting compressed air to said glove through said holder to thereby subject said glove to a source of compressed air capable of inflating said glove to a predetermined pressure, said chamber including walls for confining said glove against inflation to an amount which would normally accompany the predetermined pressure to which it has been subjected, means operatively associated with said walls of said chamber for preventing said walls from sealing said glove incidental to the confining of said glove by said walls, said predetermined pressure being of a magnitude capable of expanding relatively small self-sealing holes in said glove to an extent which will effect leakage thereof, first electrical circuit means for providing a first response in the event said glove is capable of holding said predetermined pressure for a predetermined period of time to thereby indicate that said glove does not contain any leaks, and second electrical circuit means for providing a second response in the event said glove contains a leak therein.

14. A surgical glove leak tester comprising a housing, a chamber in said housing for receiving a surgical glove having a cuff, a holder in said chamber for mounting the cuff of said glove in sealing relationship, means for causing pressurized fluid to selectively communicate with the inside of said glove when said glove is mounted on said holder, said pressurized fluid being at a pressure which is capable of stretching said glove, confining means operatively associated with said chamber for preventing said glove from expanding to the extent it would normally expand when subjected to said pressurized fluid while preventing the sealing of said holes in said glove to thereby permit glove to be tested with a sufficiently high pressure which would cause leakage through minute openings in said glove while preventing the stretching of said gloves an amount which would normally accompany said pressure of said pressurized fluid, first means including first timing means for providing an indication in the event that said glove maintains said pressure of said pressurized fluid for a first predetermined period to thereby indicate the absence of leaks in said glove, second means including second timing means for indicating if said glove initially inflates to said pressure within a second predetermined period determined by said second timing means which is less than said first predetermined period but does no retain such inflation for said first predetermined period to thereby indicate the presence of said minute openings in said glove, and means for indicating that said glove is incapable of being inflated to said pressure within said second predetermined period of time, the inability of inflating during said second predetermined period indicating the presence of a relatively large leak in said glove.

References Cited by the Examiner
UNITED STATES PATENTS

| | | | |
|---|---|---|---|
| 2,054,204 | 9/1936 | McDonald | 73—45.5 |
| 2,833,141 | 5/1958 | Holm | 73—40 |
| 3,166,439 | 1/1965 | Dennhofer | 73—45.5 |

LOUIS R. PRINCE, *Primary Examiner.*

S. C. SWISHER, *Assistant Examiner.*